United States Patent Office 3,048,837
Patented Aug. 7, 1962

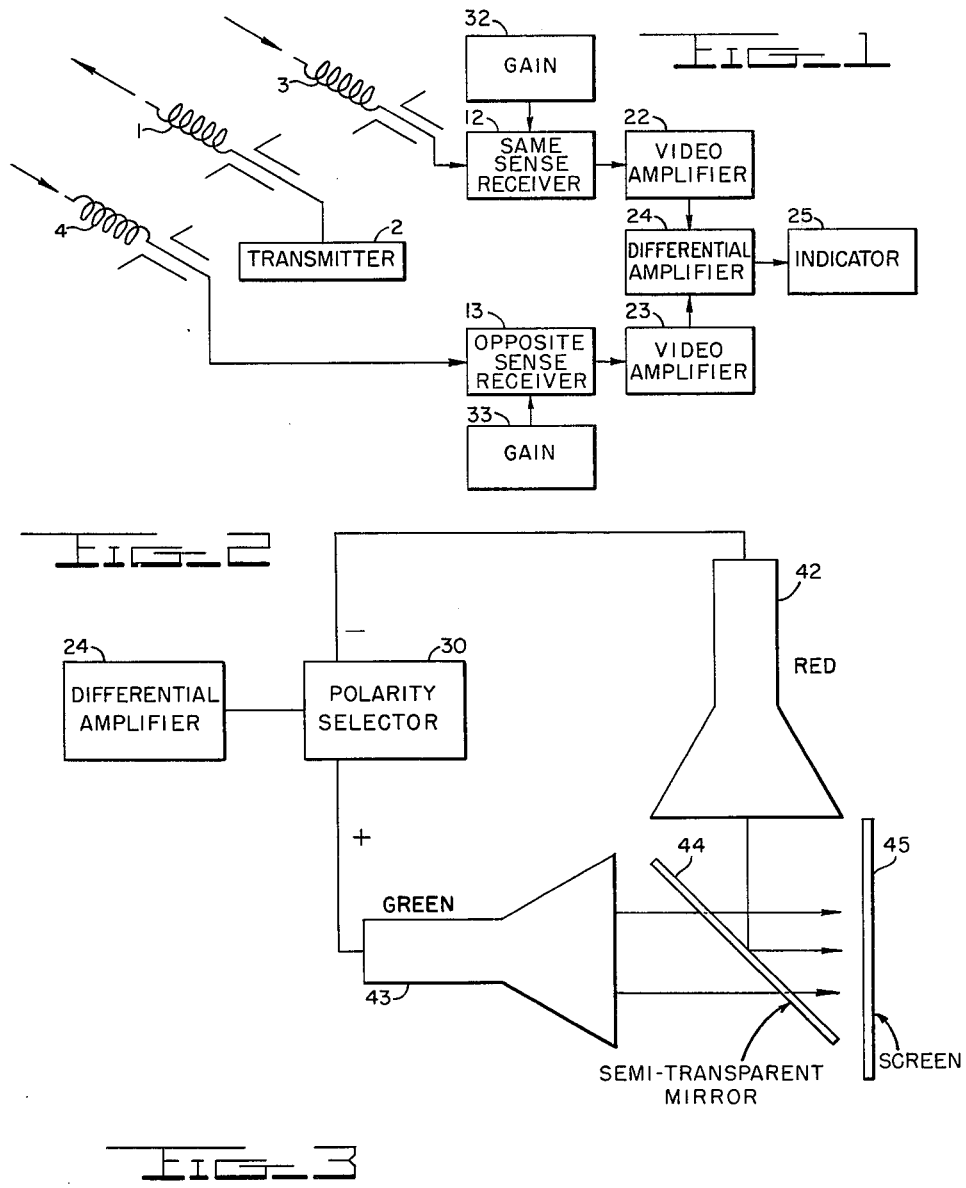

3,048,837
SIGNAL DISPLAY SYSTEM
Gerald E. Hart, Forest Heights, Md.
Filed Oct. 4, 1950, Ser. No. 188,459
8 Claims. (Cl. 343—16)
(Granted under Title 35, U.S. Code (1952), sec. 266)

My invention relates to a signal display system for radio echo apparatus and the like. More particularly it relates to a signal display system for enabling improved discrimination between various target echoes.

For a proper understanding of the subject matter of this application, it is well to define certain terms used hereinafter.

The term circular polarization as applied to the propagation of electromagnetic wave energy is a term familiar to the art and defines that kind of propagation in which the total electric field vector rotates in time phase with the propagated energy. The plane of rotation of this vector is perpendicular to the direction of propagation, and the vector magnitude remains constant as it rotates, thus describing a circle in this plane.

The term elliptical polarization is applied to propagation in which the total electric field vector both rotates in time phase with the propagated wave energy, as in circular polarization, and also varies in size, with the result that the vector describes an ellipse in the plane of the wavefront.

Thus it may be seen that circular polarization is a particular species of elliptical polarization, and for the purpose of this disclosure the two types will be labelled generically as rotational polarization.

The term plane polarization is applied to propagation in which the vector representing the total electric field varies in time phase with the propagated wave energy, but maintains a fixed orientation in the plane of the wavefront, i.e., does not rotate. The plane which contains both the direction of propagation and the electric vector is called the plane of polarization of the wave energy.

By the term rotational sense of polarization is meant the direction of rotation, about the axis of propagation of the radiated energy, and relative to the direction of propagation, of the vector which represents the total electric field. Thus the rotational sense of polarization may be referred to as clockwise or counterclockwise.

Radiation signals having rotational polarization may be propagated for example by the use of a suitable transmitting antenna of special shape, such as a helix designed for transmitting along its axis. Means are known to the prior art for receiving separately and simultaneously radiation signals having rotational polarization of opposite rotational senses. For example, two respective helical shaped antennas, when mounted for reception along their axes, and wound respectively in opposite directions, will each be sensitive to rotationally polarized radiation of only one respective sense. Such apparatus per se forms no part of my present invention.

In conventional radio echo apparatus a target is illuminated by electromagnetic radiation, and reflected radiation is recovered and used to provide a visual display of the target in terms of its direction and distance from a reference point. A basic problem in the design of radio echo apparatus for echo ranging and the like is that of producing a visual display of the various radiation reflecting targets adequate to enable large amplifications, and yet retain good discrimination between discrete targets.

By target discrimination is means the ability to distinguish discrete targets from one another and from their surrounding backgrounds.

Heretofore in radio echo apparatus return signals from targets could only be amplified by a limited amount, without obtaining on the visual display undesirable effects. Such undesirable effects take the form of blending of the target indication with surrounding background signals, merging of one discrete target indication with another nearby target indication, etc. This, of course, results in decreased target discrimination, and a decreased ability to distinguish weak targets from their surrounding backgrounds.

I have found that target discrimination in the visual display of a radio echo apparatus may be improved by the use of radiation signals having rotational polarization, in conjunction with target echo display apparatus particularly designed to derive maximum benefit from the advantages inherent in the use of radiation signals so polarized. Briefly stated, my invention provides a visual display of a radiation reflecting target in terms not only of direction and distance from a reference point but also in terms of the type of target illuminated, as determined by its radiation energy reflecting characteristics. That is, the different kinds of polarized energy reflected from different kinds of targets illuminated by rotationally polarized radiation are displayed with different visual characteristics, such as color, intensity, and the like, so as to make the displays of different targets readily characterized in terms of the respective target radiation reflecting characteristics, and thus more easily distinguished one from another and from the return of their surrounding backgrounds.

It is an object of my invention, therefore, to provide a target display system for radio echo apparatus which will enable improved target discrimination.

It is another object to provide a signal display system which will display rotationally polarized radiation signals with visual characteristics different than the display of plane polarized radiation signals.

It is a further object to provide a target display system for radio echo apparatus which will enable radiation reflecting targets to be distinguished in terms of the characteristics of the rotational sense of polarization of radiation signals they reflect.

It is another object to provide a signal display system which will display rotationally polarized radiation signals of one rotational sense of polarization with visual characteristics different than the display of rotationally polarized signals of the opposite sense.

It is another object to provide a signal display system which will display rotationally polarized radiation signals having an alternating sense with visual characteristics different from the display of signals having a non-alternating sense.

It is another object to provide a signal display system which will display rotationally polarized signals having a rapidly alternating sense with visual characteristics different from the display of rotationally polarized signals having a slowly alternating sense.

It is a further object to provide a signal display system which will display in a multicolored indication rotationally polarized radiation signals of one sense with a color characteristically different from the display color of such signals of the opposite sense.

It is a further object to provide a signal display system which will display in a multicolored indication rotationally polarized signals having an alternating sense in a color different than signals having a non-alternating sense.

It is a further object to provide a target display system which will display on an intensity modulated cathode ray indicator tube rotationally polarized radiation signals of one sense with an intensity characteristically different from the display intensity of such signals of the opposite sense.

It is a further object to provide a target display system which will display on an intensity modulated cathode ray indicator tube rotationally polarized signals of one sense with an intensity greater than the background, and such signals of the opposite sense with an intensity less than the background intensity level of the tube.

Other objects and features of the present invention will appear more fully hereinafter from the following detailed description considered in connection with the accompanying drawings which disclose one embodiment of the invention. It is expressly understood, however, that the drawings are designed for purposes of illustration only, and not as a definition of the limits of the invention, reference for the latter purpose being had to the appended claims.

In the drawings, wherein like reference characters refer to like elements in all the figures:

FIG. 1 is a block diagram of a preferred form of my invention.

FIG. 2 is a block diagram of a preferred form of the indicator portion of the combination of FIG. 1.

FIG. 3 is a block diagram of another form of indicator circuit which may be used in the combination of FIG. 1.

In FIG. 1 there is shown a helical antenna 1, energized by transmitter 2, and designed for transmitting in the direction of its axis. Energy radiated from such an antenna will be rotationally polarized, with a rotational sense of polarization determined by the direction of winding of the helix. During reception of target reflected radiation signals, by virtue of the inherent characteristics of helical antennas, returning echo signal components having a rotational sense of polarization the same as that of the transmitted energy will excite only one receiving antenna 3. Conversely, received signal components of the opposite rotational sense will excite only the other receiving antenna 4. Plane polarized signal energy can be resolved into two rotationally polarized signals of opposite polarization sense and hence will excite the two antennas equally.

As received signal energy is suitably separated by antennas 3 and 4, it may then be conveyed to separate receiver channels 12 and 13, respectively, for separate processing of received signal components of different rotational senses. In each of these two separate receiver channels there is derived a voltage which represents the portion of the total received signal having the particular rotational sense processed by that particular channel.

These two voltages can be combined to produce a differential voltage which varies in polarity and magnitude as the sense and net magnitude of the different sense components of the total received signal. This differential voltage provides a measure of the energy reflecting characteristics of the particular target or source of reflection from which the received signal is derived.

It is well known in the art that the radiation energy reflecting characteristics of a large flat homogeneous surface are such that when such a surface is illuminated by rotationally polarized electromagnetic radiation of one rotational sense, a simple reflection will be produced and the reflected radiation returning along the path of its original propagation will in general have its sense reversed. It is also well known in the art that the energy reflecting characteristics of an irregular reflecting surface are such that rotationally polarized electromagnetic energy having a particular sense will experience complex or multiple reflections by such a surface, and will experience one reversal in sense on each reflection. Thus signals returned along the path of original propagation after an odd number of reflections will have a reversed sense and those having had an even number of reflections will be returned with unreversed sense. It is also known to the art that the energy reflecting characteristics of targets which present a reflecting surface having one dimension small with relation to a half wave length, and another dimension large relative to the first dimension, for example wire or rods, are such that rotationally polarized radiation will by reflection become plane polarized, with the plane of polarization parallel to the larger dimension of the reflecting surface. Thus for example where the differential voltage above mentioned is of such polarity as to indicate consistently the predominance of reversed sense energy in a target-reflected received signal, this will in general indicate the presence of a target characterized by large flat homogeneous energy reflecting surfaces.

The respective receiver channels 12 and 13 are conventional, and their specific elements form no part of this invention. Each channel, for example, may be equivalent to the superheterodyne receiver in a conventional radio echo apparatus. The two channels are for all practical purposes identical. They are terminated in video frequency amplifiers 22 and 23 respectively, and are provided with gain controls 32 and 33 respectively.

As shown in FIG. 1 the video signals from amplifiers 22 and 23, derived respectively in channels 12 and 13 from the separately processed received signals of opposite rotational sense of polarization, are combined in differential amplifier 24. The resulting output signal from differential amplifier 24 to an indicator circuit 25 is arranged to be a negative voltage when the larger video signal fed to the amplifier 24 comes from the receiver channel processing a received signal of rotational sense opposite to the transmitted signal. Conversely, output of amplifier 24 is positive when the larger signal fed to it has the same sense as the transmitted energy. When there is an alternation in the sense of the net received signal energy at the differential amplifier, the polarity of the output of the amplifier alternates likewise. Signal energy which is plane polarized distributes its power evenly between antennas 3 and 4, and thus produces zero output at differential amplifier 24 when the two channels 12 and 13 have equal gain.

The output voltage of differential amplifier 24 may be used to provide several different types of indications by means of which targets may be distinguished one from another and from the surrounding background, and particular types of targets having known energy reflecting characteristics may be particularly displayed and easily discerned.

This output voltage may be fed, for example, through a polarity selector circuit 30, as shown in FIG. 2, which will apply signals of one polarity to one plan-position-indicator type cathode ray tube 42, and signals of the opposite polarity to another plan-position-indicator type cathode ray tube 43. This polarity selection can be accomplished for example by two amplifiers, one biased to cutoff so as to pass only positive signals, and the other biased to saturation, so as to pass only negative signals. If the two cathode ray tubes 42 and 43 are mutually perpendicular, as shown in FIG. 2, and face opposite sides of a semitransparent mirror 44 disposed at an angle of forty-five degrees, signals appearing on the faces of the tubes will be optically superimposed, when viewed at screen 45. With such an arrangement, tube 42 can be coated with a phosphor of one primary color, say red, and arranged to display negative polarity signals from differential amplifier 24, and tube 43 can be coated with a phosphor of another primary color, say green, and arranged to display positive polarity signals from differential amplifier 24. Moreover radiation signals having an alternating rotational sense, which will produce an alternating polarity output voltage at differential amplifier 24, will produce an alternating green and red indication, which will blend into the composite color yellow at screen 45 if the alternation rate is rapid. Radiation signals having a slowly alternating rotational sense will be displayed, however, as discrete primary colored signals which alternate slowly from one primary color to the other.

In practice it has been found that when radiation signals are reflected from large areas of land covered with foliage or other types of surface material resulting in a high order of multiple reflections, the reflected signals are composed about equally of elements having the same and opposite rotational sense as the transmitted energy. This produces a cancellation at differential amplifier 24, and the output is near zero. In order especially to facilitate the detection of structures such as buildings or concentrations of vehicles, which targets generally are characterized by the reflection of circularly polarized radiation signals with rotational sense reversed, the gain of the same sense receiver channel 12 may be increased slightly. When this is done, land return signals produce a net output voltage at differential amplifier 24 which is positive in polarity, and produces a green indication at screen 45. Conversely, the appearance of a red indication at screen 45 indicates the reception of a radiation signal which has a sufficient predominance of reversed polarization sense energy to overcome the difference in receiver channel gain. Thus targets so characterized can be particularly distinguished from their surrounding backgrounds.

It will be understood, of course, that the different polarity voltage output from differential amplifier 24 may be used to provide contrasting display characteristics, for signals of different senses, in more than one type of cathode ray tube display. For example in the conventional display known in the art as Type A, wherein received signals cause deflections of the scanning electron beam roughly proportional to signal strength, signals of different polarities at the output of amplifier 24 may be used to produce deflections in opposite directions. Likewise signals of different polarities may be displayed with different intensities in a conventional plan-position-indicator type cathode ray tube, or in different colors in a Type A display.

Another way to display the reflected radiation signals from targets with different reflecting characteristics is to integrate the output of differential amplifier 24 for each such target. As shown in FIG. 3, integrator 50 is fed by the output of amplifier 24. The integrator 50 may be of any conventional design, the output of which, as well known in the art, is a voltage proportional to the polarity and average net magnitude of its input. Thus for input signals having generally a negative polarity such as would be developed at amplifier 24 from signals reflected by a target which reverses the rotational sense of polarization, the output of integrator 50 might be a negative voltage of amplitude proportional to the average value of the target reflected signal. Conversely integrator 50 may develop a positive output voltage when indicating the presence of reflected signals which are returned with sense unreversed. When the reflected signals from a particular target have a rapidly alternating rotational sense which is evenly distributed between that opposite to and the same as the transmitted signals, then the output of integrator 50 will be zero. This is generally true of land or sea return from the respective land or sea backgrounds of particular targets. This is an advantage in distinguishing targets whose energy reflecting characteristics either do not vary, or vary at a relatively slow rate, since even very weak signals from such targets, when sufficiently integrated, produce a resultant signal which is clearly distinguishable from the surrounding background.

A visual indicator shown generically as voltmeter 53 is connected to the output of integrator 50, and will serve to indicate the polarity and amplitude of the output signal, thus providing an additional type of contrasting display of targets having different radiation energy reflecting characteristics.

Thus it will be seen that there has been shown and described a receiver and signal display means for radio echo apparatus, which provides for the display with contrasting characteristics of echo signals from targets having different radiation energy reflecting characteristics.

It is expressly understood that various changes and substitutions may be made in the particular embodiments of the present invention disclosed and described herein, without departing from the spirit of the invention as well understood by those skilled in the art. Reference therefore should be had to the appended claims for a definition of the limits of invention.

The invention described herein may be manufactured and used by or for the Government of the United States of America for governmental purposes without the payment of any royalties thereon or therefor.

What is claimed is:

1. In a rotationally polarized radiation energy receiver, a pair of antenna means respectively sensitive to rotationally polarized radiation energy of one sense and of opposite sense, means connected to said pair of antenna means for deriving a voltage having an amplitude and polarity proportional to the difference between received signal energy having a first rotational sense of polarization and received signal energy having a second rotational sense of polarization opposite to the first, and received signal display means controlled by the amplitude and polarity of said voltage to produce an indication characteristic of said received signal.

2. In a radio echo apparatus employing rotationally polarized radiation energy, means deriving a voltage having an amplitude and polarity proportional to the difference between received signal energy having a first rotational sense of polarization and received signal energy having a second rotational sense of polarization opposite to the first, multicolor received signal display means, and means controlled by the amplitude and polarity of said voltage to display received signals having said first sense in a first color and received signals having said second sense in a second color.

3. In a radio echo apparatus employing rotationally polarized radiation energy, means deriving a voltage having an amplitude and polarity proportional to the difference between received signal energy having a first rotational sense of polarization and received signal energy having a second rotational sense of polarization opposite to the first, multicolor received signal display means, means controlled by the amplitude and polarity of said voltage to display received signals having said first sense in a first color and received signals having said second sense in a second color, and means superimposing said different colored displays to display received signal energy having a rapidly alternating sense in a third color which is an intermediate composite of said first and second colors.

4. In a radio echo apparatus including a transmitter for transmitting rotationally polarized radiation signals, separate respective receiver channels for target reflected radiation signals having rotational senses of polarization respectively the same as and opposite to said transmitted signals, means differentially combining the outputs of said separate receiver channels and developing a voltage having a magnitude proportional to the differential combination and a polarity indicative of the rotational sense of the larger signal in said receiver channels, multicolor indicator means for producing a visual display of said target reflected radiation signals, and means responsive to said developed voltage to vary the color of said visual display.

5. In a radio echo apparatus employing rotationally polarized radiation energy, means deriving a voltage having an amplitude and polarity proportional to the difference between received signal energy having a first rotational sense of polarization and received signal energy having a second rotational sense of polarization opposite to the first, intensity modulated cathode ray received signal display means, and means controlled by the amplitude and polarity of said voltage for varying the intensity of said received signal display above and below an average value, whereby received signal energy having said first sense will be displayed with an intensity greater than said average value and received signal energy having said second sense will be displayed with an intensity less than said average value.

6. A radio echo apparatus comprising, means for transmitting a rotationally polarized radiation signal, means for separately receiving target reflected radiation signals having a rotational sense of polarization respectively opposite to and the same as the transmitted signal, said last named means being operative to provide voltages proportional to the energy of said separately received radiation signals, differential means connected to said last named means for combining in opposition said proportional voltages, and signal display means connected to the output of said differential means to provide indications dependent upon the relative magnitudes of said separately received radiation signals.

7. A radio echo apparatus comprising, means for transmitting a rotationally polarized radiation signal, a pair of receiving channels for separately receiving target reflected radiation signals having a rotational sense of polarization respectively opposite to and the same as the transmitted signal, gain control means in each of said channels for adjusting the relative gains thereof, differential means connected to the outputs of said receiving channels for combining them in opposition, and signal display means connected to the output of said differential means to provide indications dependent upon the relative magnitudes of said receiver channel output voltages.

8. A radio echo apparatus comprising, means for transmitting a rotationally polarized radiation signal, a pair of receiving channels for separately receiving target reflected radiation signals having a rotational sense of polarization respectively opposite to and the same as the transmitted signal, means for setting the gain of the receiving channel carrying reflected signals having the same sense of polarization as the transmitted signal to provide greater signal amplification than said other receiving channel, differential means connected to the outputs of said receiving channels for combining them in opposition, and signal display means connected to the output of said differential means to provide indications dependent upon the relative magnitudes of said receiver channel output voltages whereby said signal display is influenced to a greater extent by received signals having polarization of the same sense as said transmitted signal.

References Cited in the file of this patent

UNITED STATES PATENTS

| | | |
|---|---|---|
| 2,408,848 | Hammond | Oct. 8, 1946 |
| 2,423,644 | Evans | July 8, 1947 |
| 2,445,895 | Tyrrell | July 27, 1948 |
| 2,489,615 | Brittain | Nov. 29, 1949 |
| 2,502,394 | Smith | Mar. 28, 1950 |
| 2,506,127 | Allen | May 2, 1950 |
| 2,508,571 | Hudspeth | May 23, 1950 |
| 2,540,536 | Lindenblad | Feb. 6, 1951 |
| 2,542,825 | Mesa | Feb. 20, 1951 |
| 2,901,747 | Sunstein | Aug. 25, 1959 |

FOREIGN PATENTS

| | | |
|---|---|---|
| 864,403 | France | Apr. 26, 1941 |